US 6,714,393 B2

(12) United States Patent
Nostrand

(10) Patent No.: US 6,714,393 B2
(45) Date of Patent: Mar. 30, 2004

(54) TRANSIENT SUPPRESSION APPARATUS FOR POTENTIALLY EXPLOSIVE ENVIRONMENTS

(75) Inventor: Thomas Joseph Nostrand, Hinesburg, VT (US)

(73) Assignee: Simmonds Precision Products, Inc., Charlotte, NC (US)

( * ) Notice: Subject to any disclaimer, the term of this patent is extended or adjusted under 35 U.S.C. 154(b) by 104 days.

(21) Appl. No.: 10/040,768

(22) Filed: Jan. 7, 2002

(65) Prior Publication Data

US 2003/0128493 A1 Jul. 10, 2003

(51) Int. Cl.[7] .............................................. H02H 9/00
(52) U.S. Cl. ........................................ 361/58; 361/111
(58) Field of Search .................... 361/54, 58, 93.1, 361/93.7, 93.9, 111, 119

(56) References Cited

U.S. PATENT DOCUMENTS

| 3,603,811 | A | * | 9/1971 | Day et al. ................. 327/328 |
| 3,631,264 | A | | 12/1971 | Morgan ..................... 307/237 |
| 4,513,617 | A | | 4/1985 | Hayes ......................... 73/313 |
| 4,533,970 | A | | 8/1985 | Brown ........................ 361/58 |
| 5,045,963 | A | | 9/1991 | Hansen et al. ................. 361/87 |
| 5,729,418 | A | * | 3/1998 | Lei .............................. 361/58 |
| 6,278,381 | B1 | * | 8/2001 | Bogert ....................... 340/945 |

FOREIGN PATENT DOCUMENTS

| DE | 39/31537 A | 8/1985 | ........... H04L/29/14 |
| WO | WO99/60539 | 11/1999 | ........... G08B/21/00 |

OTHER PUBLICATIONS

PCT International Search Report dated Apr. 25, 2003 (4 pgs.).

* cited by examiner

*Primary Examiner*—Ronald W. Leja
(74) *Attorney, Agent, or Firm*—Calfee, Halter & Griswold LLP; David R. Percio

(57) ABSTRACT

Transient suppression apparatus, which is coupleable in series with an electrical pathway into a potentially explosive environment for limiting current, voltage and energy thereto, comprises: an impedance element coupleable in series with the electrical pathway to conduct current to the potentially explosive environment; at least one first semiconductor element and at least one second semiconductor element coupled in series with the impedance element upstream and downstream of the impedance element, respectively. Both of the first and second semiconductor elements operative to impose a series resistance to the current of the electrical pathway governed by the voltage potential across the impedance element. A exemplary application for the transient suppression apparatus is a system for determining a quantity of fuel in a container which comprises: at least one sensor disposed at the container for sensing a quantity of fuel in the container; sensor excitation system coupled to each of the at least one sensor through an electrical pathway for providing an excitation signal thereto; and transient suppression apparatus as described directly above disposed in series with each electrical pathway for limiting current, voltage and energy to the container.

6 Claims, 2 Drawing Sheets

TRANSIENT SUPPRESSION APPARATUS FOR POTENTIALLY EXPLOSIVE ENVIRONMENTS

BACKGROUND OF THE INVENTION

The present invention is directed to transient suppression devices, in general, and more particularly, to transient suppression apparatus coupleable in series with an electrical pathway into a potentially explosive environment for limiting current, voltage and energy to levels considered safe for such environments, and to systems utilizing such apparatus.

An aircraft fuel measurement or indication system is an example of a system which utilizes transient suppression devices for limiting current, voltage and energy into a potentially explosive environment. In such a system, sensors are disposed at or in the fuel tank of the aircraft and a sensor excitation system remote from the tank generates excitation signals over electrical pathways to the sensors for measuring the quantity of fuel in the tank. Currently, there are many different types of sensors, comprising capacitive, inductive and/or resistive elements, for example, and different types of excitation signals needed to excite these sensors, like alternating current (AC), direct current (DC) and/or pulsed excitation signals, for example. Because of these differing system applications, the transient suppression solutions therefor need to accommodate differing levels of current, voltage and energy protection.

In addition, recent new requirements have been specified to insure aircraft safety, specifically associated with fuel tank safety which is considered a potentially explosive environment. These requirements apply to multiple threat and failure conditions that could impose unsafe levels of energy, voltage and current into the potentially explosive fuel tank environment if left unprotected. Existing transient suppression devices which are disposed in the electrical pathways use magnetic isolation, such as inductors and/or transformers and band pass circuit filtering, for example, to limit the current, voltage and energy parameters of the electrical pathways to the fuel tank. While an adequate solution, each transient suppression device needs to be tailored or designed for a specific application or group of similar applications in order to accommodate the level of current, voltage and energy protection required therefor while maintaining the level of sensitivity of an existing solution at normal operation taking into account parasitic components of the electrical pathways. Accordingly, there is no known existing transient suppression solution that may be universally used for the many different types of sensor/system applications and requirements therefor.

The present invention intends to overcome the drawbacks of the existing transient suppression devices and systems utilizing the same by offering substantially universal transient suppression apparatus which will provide the specified protection with different types of sensors and sensor excitation signaling and not be subject to the level of sensitivity that the existing solutions have at normal sensor measurement operation.

SUMMARY OF THE INVENTION

In accordance with one aspect of the present invention, transient suppression apparatus, which is coupleable in series with an electrical pathway into a potentially explosive environment for limiting current, voltage and energy thereto, comprises: an impedance element coupleable in series with the electrical pathway to conduct current to the potentially explosive environment, the current causing a voltage potential across said impedance element; at least one first semiconductor element coupled to the impedance element in series with the current path upstream of the impedance element, the at least one first semiconductor element operative to impose a resistance to the current of the electrical pathway governed by the voltage potential across the impedance element; and at least one second semiconductor element coupled to the impedance element in series with the current path downstream of the impedance element, the at least one second semiconductor element operative to impose a series resistance to the current of the electrical pathway governed by the voltage potential across the impedance element.

In accordance with another aspect of the present invention, a system for determining a quantity of fuel in a container comprises: at least one sensor disposed at the container for sensing a quantity of fuel in the container; sensor excitation system coupled to each of the at least one sensor through an electrical pathway for providing an excitation signal thereto; transient suppression apparatus as described directly above disposed in series with each electrical pathway for limiting current, voltage and energy to the container.

DETAILED DESCRIPTION OF THE INVENTION

Figure 1:
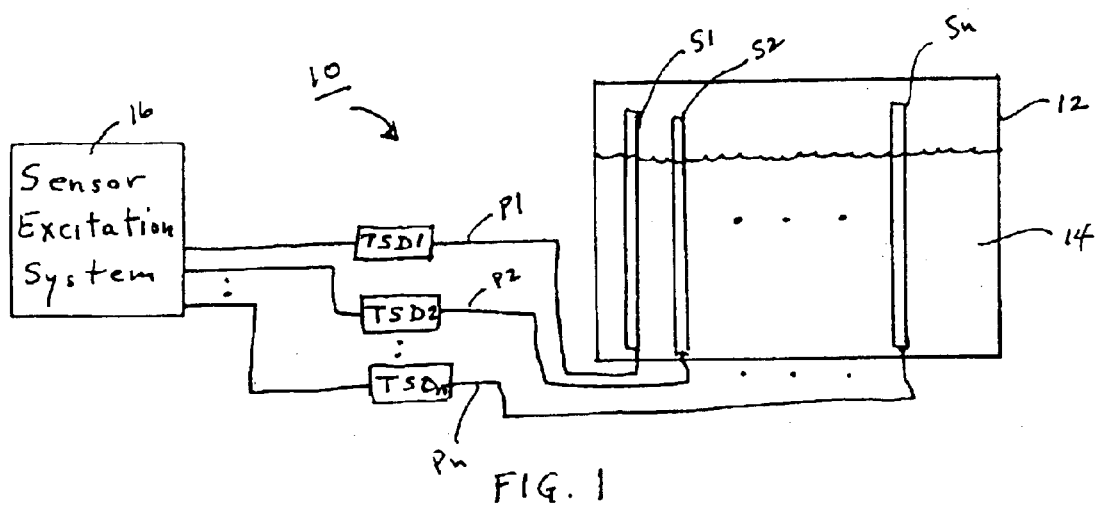
FIG. 1 is an exemplary system application of an embodiment of the present invention.

The present embodiment of the invention is described, by way of example, in connection with a fuel quantity measuring system for one or more aircraft fuel tanks such as that shown by the illustration of FIG. 1. However, it is understood that this fuel measurement system is but one example of a potentially explosive environment and that there are many other such environments that are just as suitable for embodying the present invention. Therefore, the transient suppression apparatus of the present invention should not be limited to any specific potentially explosive environment, but rather intended for use in all possible environments which are potentially explosive by nature.

Referring to FIG. 1, the system 10 as illustrated is intended for use on-board an aircraft which includes at least one fuel tank 12 having a quantity of aircraft fuel 14. At least one sensor is disposed at or in the fuel tank 12 for measuring the quantity of the fuel 14 therein. In the present embodiment, a plurality of sensors S1, S2, . . . , Sn, which may include capacitive elements are disposed in the fuel tank 12 for measuring the fuel quantity therein. While capacitive type sensors are used for describing the present embodiment, it is understood that inductive or ultrasonic pulse or a combination of sensor types may be used just as well. A conventional sensor excitation system 16 is disposed at a remote location from said fuel tank and is operative to generate excitation signals which are conducted to each sensor S1, S2, . . . , Sn over respectively corresponding electrical pathways P1, P2, . . . , Pn which are coupled respectively to the sensors S1, S2, . . . , Sn. The excitation signals may be any one of the group of signals comprising AC, DC and pulsed excitation signals depending on the type of sensor being excited thereby. Transient suppression devices TSD1, TSD2, . . . , TSDn are disposed respectively in series with each pathway P1, P2, . . . , Pn for limiting current, voltage and energy to the container 14 from each such pathway.

Figure 2:
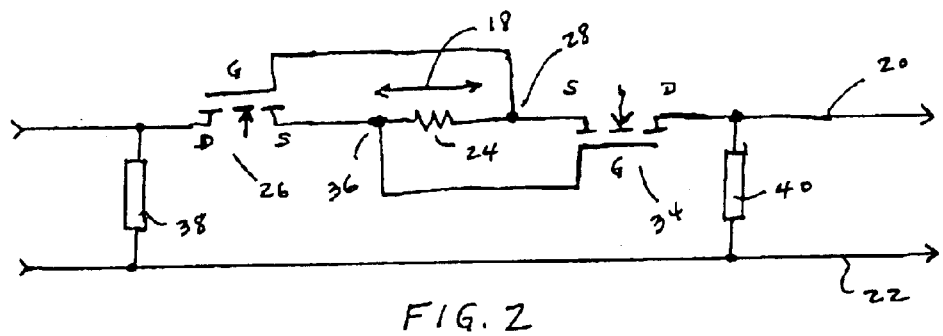
FIG. 2 is a circuit schematic of a transient suppression device suitable for embodying the present invention.

A suitable embodiment of a transient suppression device (TSD) in accordance with the present invention is shown in the circuit schematic of FIG. 2. The TSD of FIG. 2 is coupleable in an electrical pathway as described in connection with the exemplary embodiment of FIG. 1. In the present example, the electrical pathway includes a supply path 20 and a return path 22 over which current 18 may be conducted between the system 16 and sensor Si (i being 1, 2, . . . , or n). Referring to FIG. 2, an impedance element 24 is coupleable in series with the path 20 of the electrical path to conduct current into the electrically explosive fuel environment of the fuel tank 12. The current conducted to the tank 12 causes a voltage potential across the impedance element 24. In the present embodiment, the impedance element comprises a resistive element, but it is understood that other impedance elements or combinations thereof could also be used in certain applications. At least one semiconductor element 26, which may be a field effect transistor (FET), for example, is coupled to the impedance element 24 in series with the current path 18 upstream of the impedance element 24. In this embodiment, only one semiconductor element 26 is used. An embodiment using more than one semiconductor element or a plurality will be described herein below in connection with the circuit schematic of FIG. 4.

Figure 3:
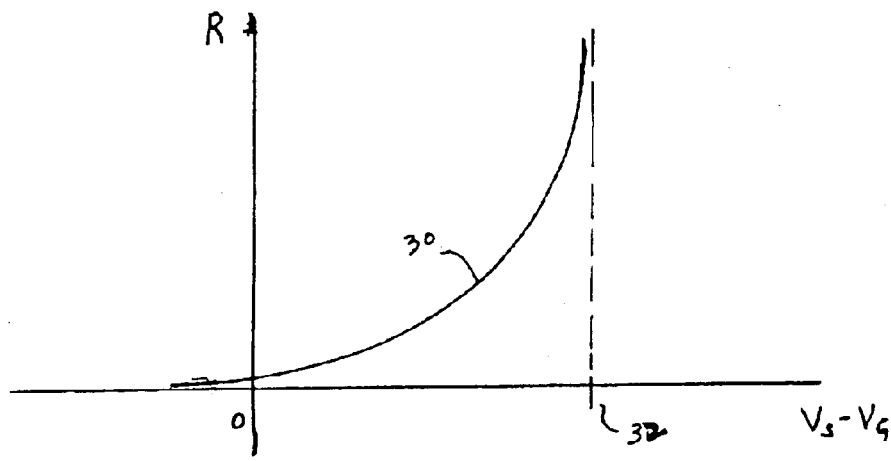
FIG. 3 is a graph illustrating the impedance characteristics of a semiconductor device suitable for use in the embodiment of FIG. 2.

More specifically, in FIG. 2, the FET 26 has its current channel S-D connected in series with the impedance element 24 in the path 20 and its gate G connected to a circuit node 28 at the downstream side of the impedance element 24. Accordingly, the voltage potential across the impedance element 24 is what governs the resistance of the current channel of the FET 26 which is in series with the electrical pathway. The resistance to voltage characteristics of the FET 26 are exemplified in the graph of FIG. 3. Referring to the graph of FIG. 3, note that as the channel to gate voltage of the FET (which is the voltage potential across the impedance element 24) varies at a first or positive polarity, the resistance of the current channel of the FET varies proportionately therewith as shown by the solid line 30 until it reaches a substantially open circuit condition at the voltage differential shown by the dashed line 32. However, at around zero differential voltage or differential voltages at a second or negative polarity, the resistance of the current channel remains substantial low. A positive polarity of voltage potential for the present example refers to current 18 in a direction from left to right or upstream to downstream through the impedance element 24 and a negative polarity of voltage potential would refer to current in the reverse direction.

Referring back to the schematic of FIG. 2, another at least one semiconductor element 34, which may also be an FET, for example, is coupled to the impedance element 24 in series with the current path 18 downstream of the impedance element 24 at node 28. Thus, the current channel S-D of the FET 34 is connected in series with the impedance element 24 in the path 20 and its gate G connected to a circuit node 36 at the upstream side of the impedance element 24. Accordingly, the voltage potential across the impedance element 24 also governs the resistance of the current channel of the FET 34 which is in series with the electrical pathway. The resistance to voltage characteristics of the FET 34 may also be exemplified by the graph of FIG. 3 except now the polarity is reversed. That is, as the channel to gate voltage of the FET 34 (which is the voltage potential across the impedance element 24) varies at a second or negative polarity, the resistance of the current channel of the FET 34 varies proportionately therewith as shown by the solid line 30 until it reaches a substantially open circuit condition at the voltage differential shown by the dashed line 32. However, at around zero differential voltage or differential voltages at a first or positive polarity, the resistance of the current channel remains substantial low.

Also, in the embodiment of FIG. 2, one or more series connected voltage potential surge suppression elements 38 and 40 may be coupled in parallel with the electrical pathway across paths 20 and 22 upstream and downstream of the TSD circuit described herein above, respectively. The surge suppression elements 38 and 40 may be of the type manufactured by Microsemi bearing model number SMCJ170CA, for example, which are capable of protecting the TSD against voltage surges of up to approximately 200 volts each or 600 volts if three (3) in series are used, for example. Also, the semiconductor elements 26 and 34 may be metal oxide semiconductor field effect transistors (MOSFETs) of the type manufactured by Infineon bearing model number BSP-149, for example, which are capable of withstanding blocking voltages of approximately 200 volts each, for example.

Prior to installation of the TSD into its designated electrical pathway, the impedance element 24 is selected based on the particular sensor and sensor excitation signal which it will accommodate under normal operating conditions. This impedance should be small enough so as to effect a voltage drop across element 24 which does not affect appreciably the sensor measurement under normal operating conditions, but large enough to effect a voltage drop which will maintain the transistors 26 and 34 biased "on" under such conditions. For most applications, a resistance of on the order of one hundred ohms (100Ω), for example, may be used for the impedance element. When biased "on", the transistors 26 and 34 each provide a small series resistance in the current pathway as illustrated by the exemplary characteristics of FIG. 3. The series resistance of the transistors 26 and 34 and the resistance of the element 24 should be selected so as to not affect the performance of the sensor measurements or system operation under normal operating conditions.

When a TSD is disposed in an electrical pathway to a potentially explosive environment, if an external threat, such as a lightning induced voltage, electromagnetic interference (EMI) induced energy or the like, for example, or a failure of the electrical pathway to a power line which may be 115V, 400 Hz or 28 VDC, for example, or a latent failure condition that may emulate a current or voltage path to ground potential in the fuel tank should occur, the TSD will regulate and limit the current, voltage and energy to the environment to specified safe levels. During a threat or failure condition, an increase in the current 18 through the element 24 will cause a voltage potential across element 24 that governs at least one of the transistors 26 and 34 to start to shut "off", i.e. become blocking or non-conducting, which increases the series resistance thereof to the current path. Under such abnormal conditions, the transistors 26 and 34 act as non-linear resistors which regulate the current into the potentially explosive environments, or in the case of the present embodiment, the aircraft fuel tank 14. This current into the potentially explosive environment remains limited to safe levels by the TSD even in the face of increasing external voltage or current threats. For example, the energy and current may be limited to less than 200 microjoules ($\mu J$) of energy and 20 milliamps (mA) of current into the fuel tank or environment in some cases. Also, each transistor is capable of blocking voltages of on the order of 200 volts, for example. Abnormal voltage may be also limited by the surge suppression elements 38 and 40 to voltage levels of 600 volts, for example, where three such devices in series are used.

The TSD operates in response to threats and failures inducing increasing current 18 of both positive and negative polarities. For example, as the current 18 is increased abnormally with the first or positive polarity, the series resistance of transistor 26 is governed to increase by the polarity of the voltage potentially induced across the element 24 and thus, regulates current 18 to safe levels. The resistance of the transistor 34 remains at a relatively low value because the voltage potential across the element 24 governs the transistor 34 with the reverse polarity to that of the transistor 26 (refer to FIG. 2). Also, as the current 18 is increased abnormally with the second or negative polarity, the series resistance of transistor 34 is governed to increase by the polarity of the voltage potential across element 24 and thus, regulates current 18 to safe levels. The resistance of the transistor 26 remains at a relatively low value because the voltage potential across the element 24 governs the transistor 26 with the reverse polarity to that of the transistor 34 (refer to FIG. 2).

Note that each of the transistors 26 and 34 of the embodiment of FIG. 2 is intended to represent one or more semiconductor elements each of which being operative to vary its blocking resistance to current 18 of the corresponding electrical pathway in response to a variation of the voltage potential across the impedance element 24. The blocking resistance of the at least one semiconductor element represented by element 26 is varied by a voltage potential across the element 24 of a first or positive polarity and the blocking resistance of the at least one semiconductor element represented by element 34 is varied by a voltage potential across the element 24 of a second or negative polarity. A suitable embodiment for a TSD having a plurality of semiconductor elements both upstream and downstream of the impedance element 24 is illustrated in the circuit schematic of FIG. 4.

Figure 4:
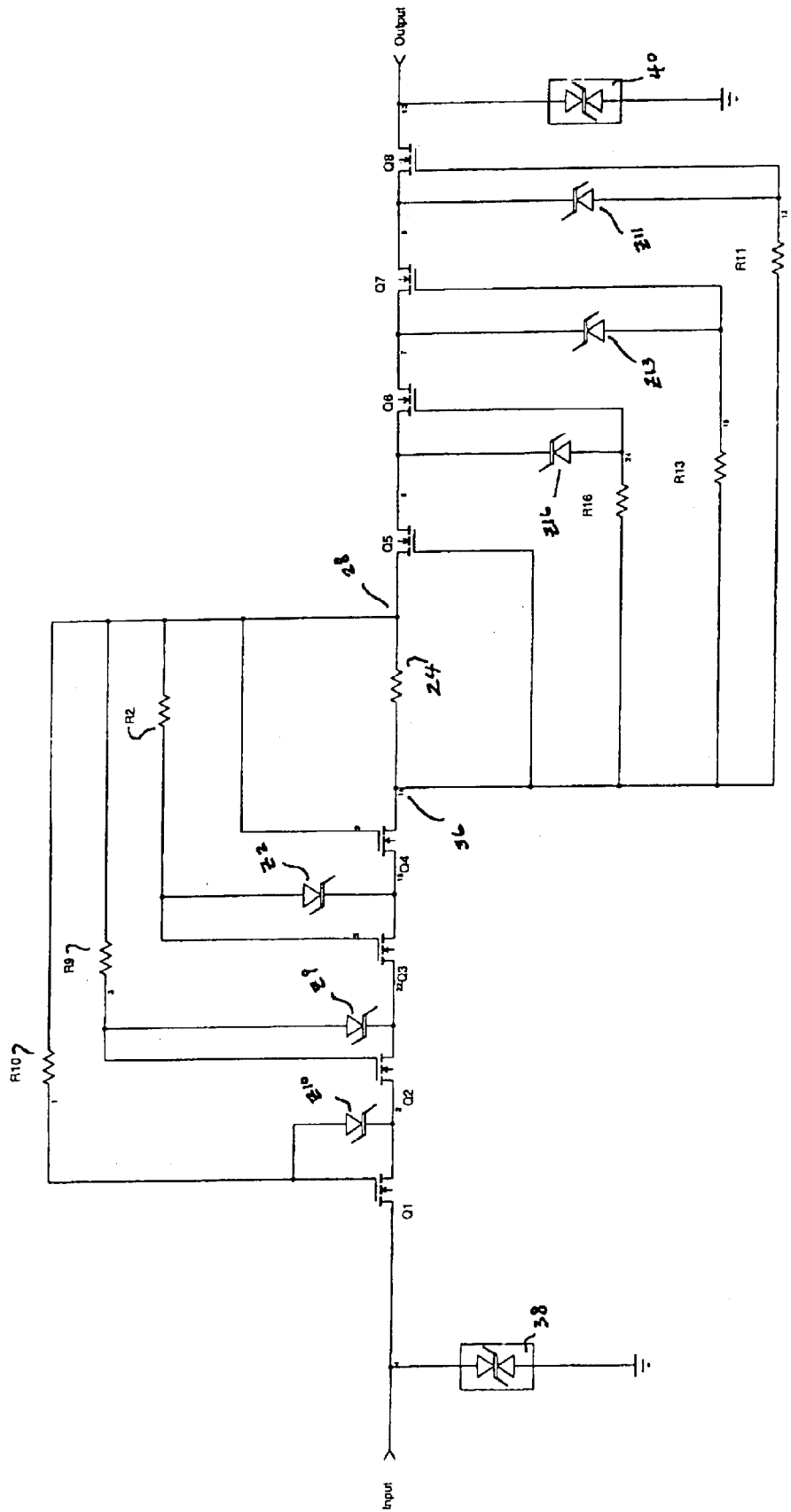
FIG. 4 is circuit schematic of an alternate transient suppression device suitable for embodying the present invention.

Referring to FIG. 4, the plurality of semiconductor elements represented by transistor 26 comprises field effect transistors Q1–Q4 which have their current channels coupled in series upstream of the element 24 between the input of the path 20 of the TSD and the node 36, Q4 being coupled to node 36 and Q1 being coupled to the input node. The gate of transistor Q4 is coupled directly to node 28 and the gates of transistors Q1 through Q3 are coupled to node 28 through resistors R10, R9 and R2, respectively. Voltage potential limiting circuit elements Z10, Z9 and Z2 are coupled respectively, anode-to-cathode, between the gates and current channels of transistors Q1 through Q3. The circuit elements Z10, Z9 and Z2 may be conventional transient suppression type zener diodes capable of limiting voltage potentials of on the order of fifteen (15) volts, for example. Also in FIG. 4, the plurality of semiconductor elements represented by transistor 34 comprises field effect transistors Q5–Q8 which have their current channels coupled in series downstream of the element 24 between the output of the path 20 of the TSD and the node 28, Q5 being coupled to node 36 and Q8 being coupled to the output node. The gate of transistor Q5 is coupled directly to node 36 and the gates of transistors Q6 through Q8 are coupled to node 36 through resistors R16, R13 and R11, respectively. Voltage potential limiting circuit elements Z16, Z13 and Z11 are coupled respectively, anode-to-cathode, between the gates and current channels of transistors Q6 through Q8. The circuit elements Z16, Z13 and Z11 may be conventional transient suppression type zener diodes capable of limiting voltage potentials of on the order of fifteen (15) volts, for example.

Accordingly, the channel resistances of transistors Q1–Q4 which may be MOSFETs, for example, are operational to block abnormal currents 18 which induce a positive polarity voltage potential across element 24 and thus, block abnormal voltages of a positive polarity and limit the current, voltage and energy to the potentially explosive environment under adverse threat and failure conditions. Likewise, the channel resistances of transistors Q5–Q8 which also may be MOSFETs, for example, are operational to block abnormal currents 18 which induce a negative polarity voltage potential across element 24 and thus, block abnormal voltages of a negative polarity and limit the current, voltage and energy to the potentially explosive environment under adverse threat and failure conditions. The zener-resistor pairs Z10-R10, Z9-R9 and Z2-R2 protect the channel to gate junctions of transistors Q1, Q2 and Q3 respectively, by limiting the voltage potential thereacross. Similarly, zener-resistor pairs Z16-R16, Z13-R13 and Z11-R11 protect the channel to gate junctions of transistors Q6, Q7 and Q8 against over voltage in the same manner. In an operating environment in which a large amount of EMI is anticipated, some additional EMI filtering may be added to the transient suppression circuit at both the input and output thereof.

While the present invention has been described by way of example in connection with one or more embodiments herein above, it is understood that it should not be limited in any way, shape or form to such embodiments. Rather the present invention should be construed in breadth and broad scope in accordance with the recitation of the appended claims.

What is claimed is:

1. A system for determining a quantity of fuel in a container, said system comprising:

at least one sensor disposed at said container for sensing a quantity of fuel in the container;

sensor excitation system coupled to each of said at least one sensor through an electrical pathway for providing an excitation signal thereto;

transient suppression apparatus disposed in series with each said electrical pathway for limiting current, voltage and energy to the container, said apparatus comprising:

an impedance element coupled in series with said electrical pathway to conduct current to the sensor to which it is coupled, said current causing a voltage potential across said impedance element;

at least one first field effect transistor coupled to said impedance element in series with said current path upstream of said impedance element, each said at least one first field effect transistor having a source and gate connected respectively to an upstream side and a downstream side of said impedance element, and controlled directly by the voltage potential across said impedance element to impose a series resistance to said current of said electrical pathway proportional to the voltage potential of a first polarity across said impedance element; and at least one second field effect transistor coupled to said impedance element in series with said current path downstream of said impedance element, each said at least one second field effect transistor having a source and gate connected respectively to the downstream side and the upstream side of said impedance element, and controlled directly by the voltage potential across said impedance element to impose a series resistance to said current of said electrical pathway proportional to the voltage potential of a second polarity across said impedance element.

2. The system of claim 1 being disposed on an aircraft; and wherein the container comprises an aircraft fuel tank and the fuel comprises aircraft fuel.

3. The system of claim 1 wherein the sensor excitation system is operative to generate an excitation signal of the group of signals comprising AC, DC and pulsed excitation signals to excite a sensor at the container; and wherein each transient suppression apparatus is adaptable to accommodate any excitation signal of said group.

4. The system of claim 1 wherein the transient suppression apparatus is operative to limit the current, voltage and energy to the container caused by threats to the system to within levels considered safe.

5. The system of claim 1 wherein the transient suppression apparatus is operative to limit the current, voltage and energy to the container caused by failures of the system to within levels considered safe.

6. The system of claim 1 wherein the transient suppression apparatus is disposed in series with each electrical pathway in close proximity to the container.

* * * * *